Nov. 7, 1933.   H. E. WHITE   1,934,516
ELEVATOR CONTROL SYSTEM
Filed Feb. 28, 1931   3 Sheets-Sheet 1
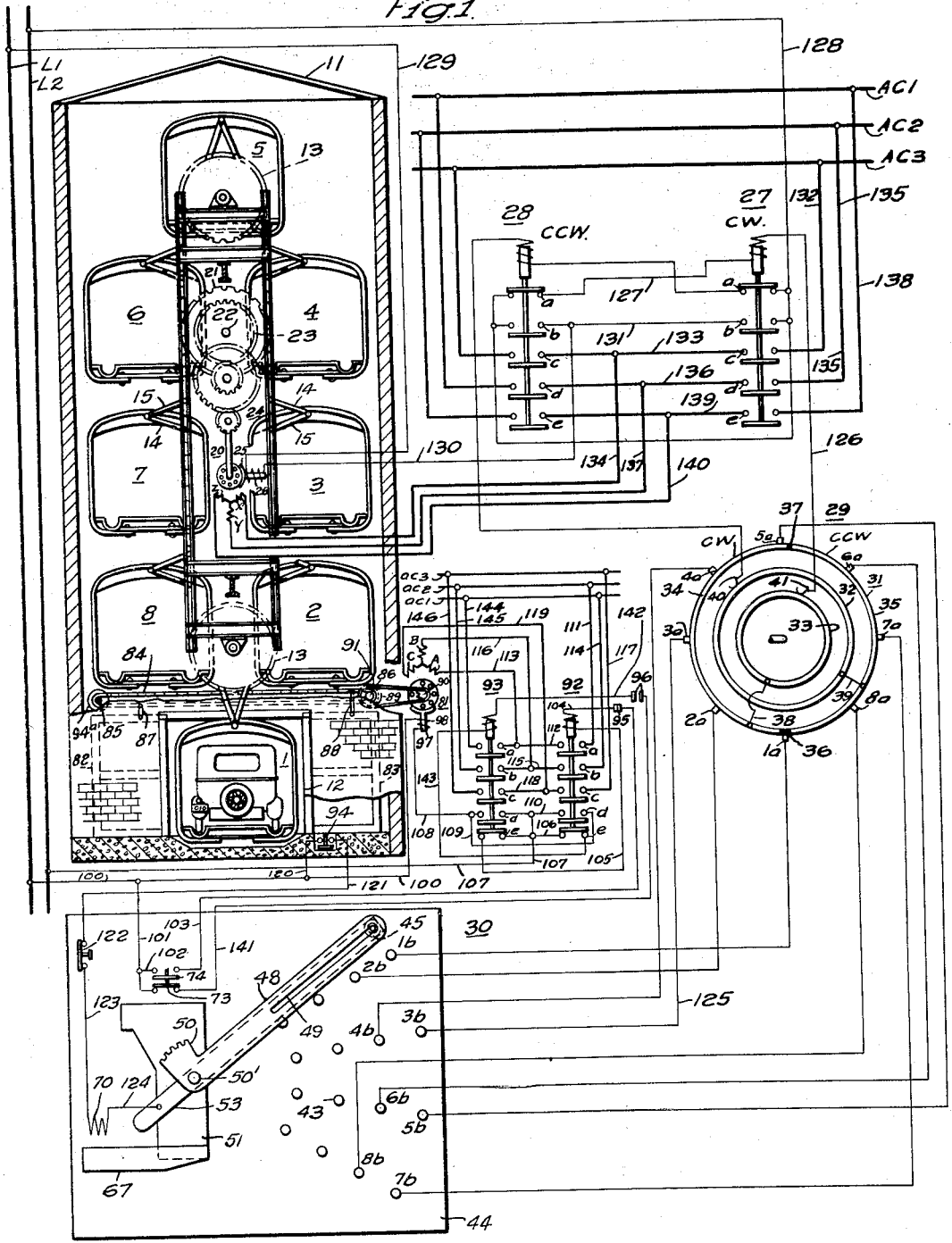
WITNESSES.
INVENTOR
Harold E. White.
BY
ATTORNEY

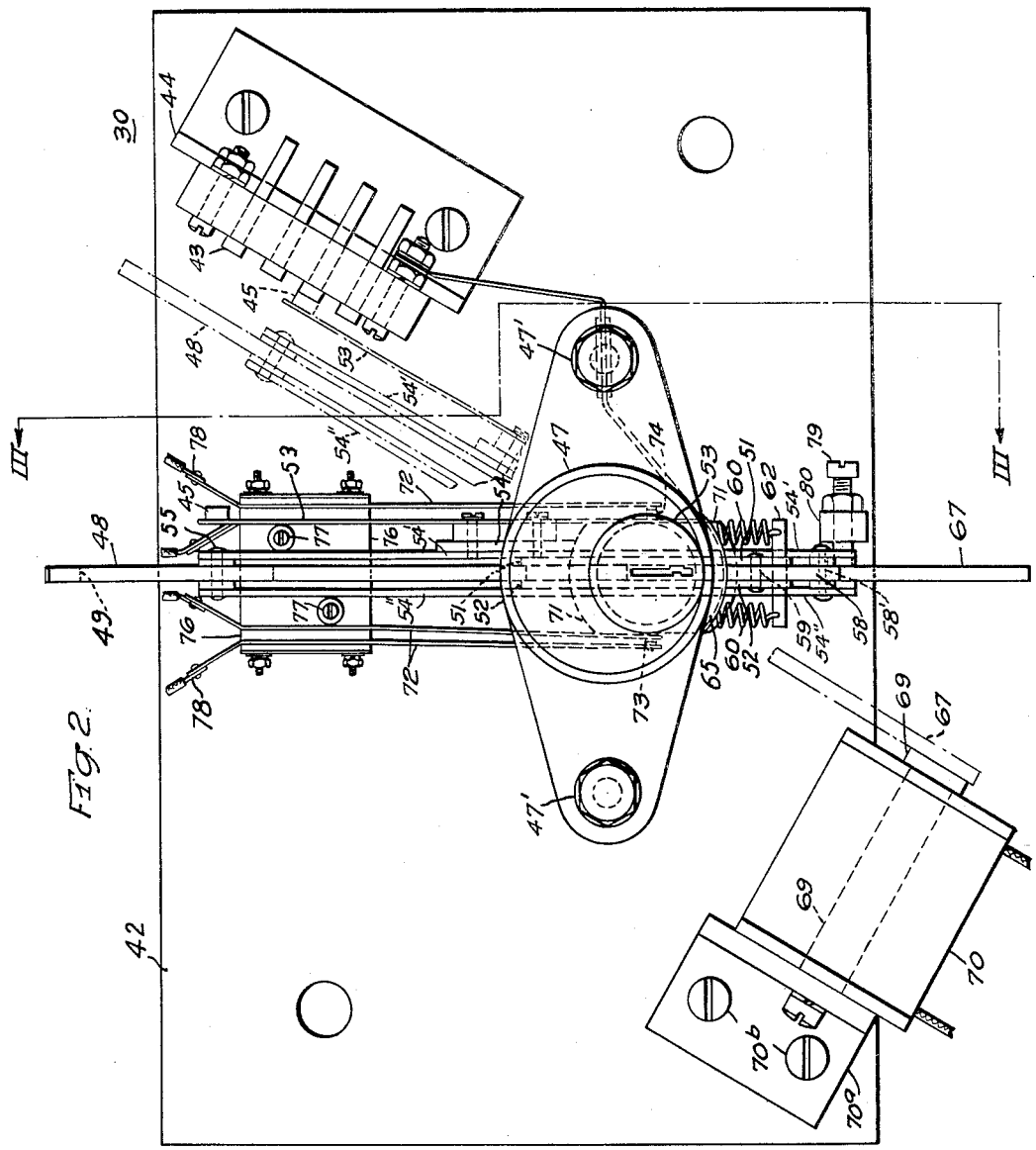

Nov. 7, 1933.   H. E. WHITE   1,934,516
ELEVATOR CONTROL SYSTEM
Filed Feb. 28, 1931   3 Sheets-Sheet 3
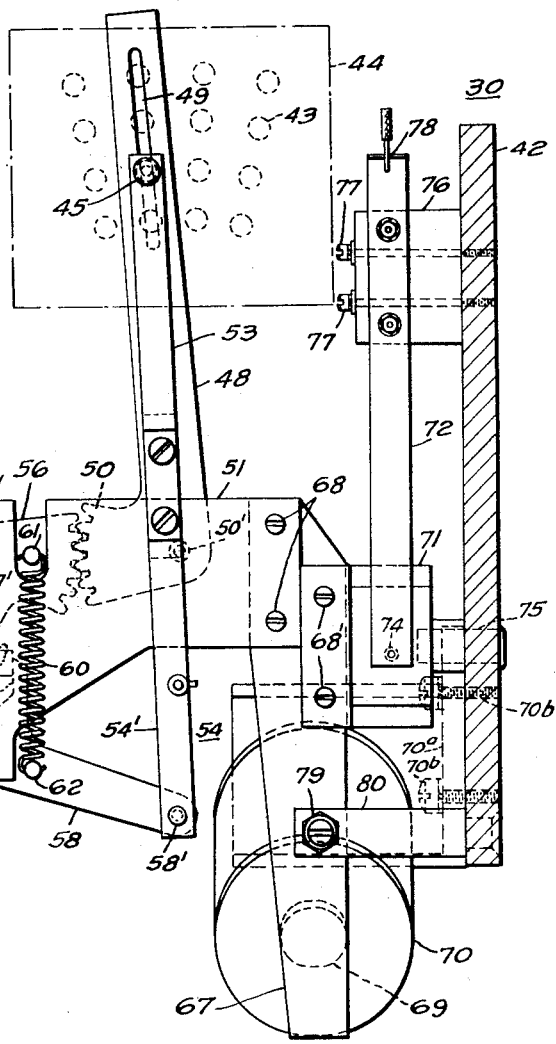
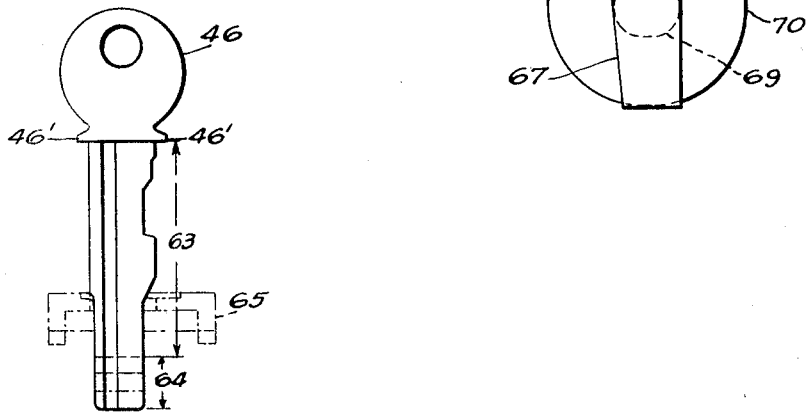
INVENTOR
Harold E. White.

Patented Nov. 7, 1933

1,934,516

UNITED STATES PATENT OFFICE 1,934,516

ELEVATOR CONTROL SYSTEM

Harold E. White, Wilkinsburg, Pa., assignor to Westinghouse Electric & Manufacturing Company, a corporation of Pennsylvania Application February 28, 1931. Serial No. 518,957

7 Claims. (Cl. 187—16)

My invention relates to control systems for circuitous elevators adapted for the storage of automobiles and it has particular relation to control systems comprising control switches for selectively calling predetermined cages of circuitous elevators to stations.

The term "circuitous elevator", as employed herein, is intended to apply to any conveyor structure having one or more cages, receptacles or slings, movable in a circuitous or endless path.

As a solution to the problem of parking automobiles in traffic-congested business areas of large cities, the use of circuitous elevators for storing a large number of automobiles upon a comparatively small ground area was long ago suggested, and circuitous elevators of various types have been proposed, in some of which the cages moved principally in vertically extending paths, in others of which the cages moved principally in horizontally extending paths, and in still others of which the cages moved through a combination of vertically and horizontally extending paths.

Regardless of the nature of the paths of movement of the cages in the circuitous elevators of various types proposed, the term "circuitous" or "endless" is applicable to all.

Control systems of various types have been suggested for effecting a movement of the cages of circuitous elevators. The simplest of the control systems proposed comprises the ordinary control system for reversably controlling a driving motor or motors for moving the cages of a circuitous elevator.

In the co-pending application of F. E. Lewis, Serial No. 398,898, filed October 11, 1929, now Patent 1,856,876, and assigned to the Westinghouse Electric and Manufacturing Company, is described and claimed a control system for a circuitous elevator which comprises means for calling a predetermined cage to a loading and unloading station by the shortest route, and automatically effecting the stopping of the selected cage upon its arrival at the loading and unloading station. There is described in detail, a manually operable combination dial and selector device which comprises a brush arm manually rotatable into any angular position corresponding to the cage or receptacle which it is desired to call by means of a pointer and a dial or disc having characters or numerals regularly spaced around the periphery thereof, each character corresponding to a particular cage or receptacle. The selector device comprises further a split collector ring having two substantially semi-circular conducting segments, each electrically connectable to one terminal of a source of energy through so-called clockwise and counter-clockwise direction relays, controlling the actuation of the driving motor, whereby movement of the cages in those directions is effected. The split collector ring and the other two rings are suitably mounted, as on a drum, for rotation in accordance with the movement of the cages of the elevator. The collector rings are provided, one for each of the segments of the split collector ring, for the purpose of establishing an electrical connection to the segments from the direction relays controlling the actuation of the driving motor. A short insulating segment between the two juxtaposed ends of conducting segments on the split collector ring is employed for interrupting a circuit through the rotatable brush arm, one of the conducting segments of the split collector ring and the corresponding direction relay for automatically stopping the selected cage at the loading and unloading station. The physical relation of the conducting segments of the split collector ring and the brush arm, as set by the pointer, and dial automatically determines the actuation of the driving motor to move the selected cage to the loading and unloading station by the shortest route.

A modification of such direction selector switch and its associated control apparatus is described and claimed in the co-pending application of Henry D. James and H. E. White, Serial No. 453,110, filed May 31, 1930, and assigned to the Westinghouse Electric and Manufacturing Company, which comprises a plurality of push buttons, each of which corresponds to a particular cage of a circuitous elevator, provided for the purpose of establishing an electrical connection to a plurality of brushes corresponding, respectively, thereto and disposed at regular intervals around the periphery of the split collector ring in engagement therewith. In other words, a plurality of push-button switches and brushes corresponding, respectively, thereto are employed as an improvement over the rotatable brush arm described in the application, Serial No. 398,898, now Patent 1,856,876 above mentioned.

In my present invention, I provide a lock-type switch device operable by a plurality of diverse keys for establishing, selectively, the connections to a plurality of brushes in engagement with a split collector ring on a direction selector device which effects the automatic selection of direction of rotation of a circuitous elevator to cause a selected cage to move to a loading and unloading station by the shortest route, as an improvement over the plurality of push-button switches described in the co-pending application, Serial No. 458,110, above-mentioned. I thus simplify the control and, accordingly, effect a reduction in the cost thereof, as well as insure the safe operation of the control system by permitting only one person at a time to operate it.

One object of my invention is to provide, in combination with a control system for a circuitous elevator, a lock-type control switch operable by a plurality of diverse keys for selectively establishing a call for any particular cage in accordance with the key employed.

Another object of my invention is to prevent access to all cages of a circuitous elevator except the one corresponding to a particular key, by rendering the control for the elevator selectively responsive to the contour of the key employed.

A further object of my invention is to provide a key-operated control switch having a single key-hole for receiving a plurality of diverse keys whereby, any one of a plurality of electrical circuits is selectively established in accordance with the key employed.

Other objects of my invention will be apparent from the following specification, when read in connection with the accompanying drawings, wherein Figure 1 is a diagrammatic view, in front elevation, of a circuitous elevator, parts of which are broken away, and a diagram of a control system therefor, embodying the control switch comprising my present invention;

Fig. 2 is an enlarged view, in front elevation, of the key-operated control switch included in the control system comprising my invention;

Fig. 3 is a sectional view, taken on line III—III of Fig. 2, showing, in further detail, the construction of the key-operated control switch, and, Fig. 4 is a view, in detail, of a key for operating the control switch comprising my invention, showing, by broken lines, the variations in the length and contour thereof, whereby the automatic selective operation of the switch is effected in accordance with the key employed.

My invention is applicable to a circuitous elevator of any type, but, for the purpose of illustration, I have shown, in Fig. 1, a circuitous elevator which comprises a building structure 11, having a plurality of cages, receptacles or slings, 1 to 8, respectively, which are movable successively through two adjacent vertical portions of an endless path and successively past a doorway 12, through which the entrance and exit of automobiles, to and from the cages, is effected. For the purpose of illustration, the doorway 12 is shown at the bottom of the building structure 11, whereby automobiles may be driven directly therethrough and through the ends of the receptacles to their proper positions. The entrance and exit of automobiles to and from the cages may, however, be effected by moving them laterally, as by a low truck or dolly, through a doorway disposed in any position along the vertical paths of movement of the cages.

The cages 1 to 8 are pivotally suspended from, and between, a pair of endless chains 13 (one only of which is shown in Fig. 1), disposed vertically in parallel spaced planes. Two angularly disposed, relatively movable bracket arms 14 and 15 are provided for attaching one end of each receptacle to one of the endless chains 13, and similar bracket arms are employed for attaching the opposite end of each receptacle to the other endless chain. The bracket arms 14 and 15 may connect points on each cage which are at equal elevations, but a structure in which the top of one end of a cage is attached to one endless chain and the bottom of the opposite end of a cage is attached to the other endless chain is preferred, since objectionable swaying or swinging of a cage during movement in the endless path is thereby prevented. The details of such a structure are described and claimed in the copending application, Case No. 16,081, of Henry D. James and Gilbert Currie, assigned to the Westinghouse Electric and Manufacturing Company.

Any suitable means may be provided for moving all of the cages simultaneously in the endless path. For the purpose of illustration, I have shown a driving motor 20 suitably mounted on the building structure 11 for simultaneously rotating a pair of sprocket wheels 21, one of which engages the vertically extending portions of one endless chain on its diametrically opposite sides and the other of which similarly engages the other endless chain. The two sprocket wheels 21 are keyed, or otherwise suitably secured, to a common shaft 22, having a gear wheel 23 on one end thereof which is driven by the motor 20 through a speed-reducing gear mechanism 24. I have shown the motor 20 as being of a three-phase induction type, but it should be understood that a motor of any other suitable type may be employed.

A brake 25 for the motor 20 is provided which is of a well known construction. It is provided with a magnetizing coil 26 for releasing it whenever the motor 20 is actuated to rotate, and with a biasing means, such as a spring, for automatically setting it upon the deenergization of the magnetizing coil 26, effected by the stopping of the motor 20.

Referring to Fig. 1, it will be seen that the control system for the driving motor 20 comprises a clockwise direction relay 27, a counter-clockwise direction relay 28, a direction selector switch 29 and a key-operated selective call switch 30.

The relays 27 and 28, when energized, effect the actuation of the driving motor 20 in such manner that it causes the cages to move in a clockwise and in a counter-clockwise direction, respectively, when viewed from the doorway 12.

The direction selector switch 29 automatically selects which of the relays 27 or 28 shall be actuated upon the operation of the call switch 30, since it is responsive to the physical position of a selected cage at the time of calling, and thus it effects the movement of a selected cage to the doorway 12 by the shortest route and automatically causes it to stop upon its arrival at the doorway. A selector switch, such as 29, is fully described in the above-mentioned co-pending applications and it should be understood that it constitutes a part of the present invention only in combination with other elements to be subsequently described.

For the purpose of rendering my invention more readily understandable, a brief description of the selector switch 29 is given herewith immediately following.

The direction selector switch 29 is illustrated diagrammatically in Fig. 1 as comprising two collector rings, 32 and 33 and a split-collector ring 31. The ring 31 comprises two semi-circular conducting segments 34 and 35 having a short insulating segment 36 between two of the juxtaposed ends and a shorter insulating segment 37 between the other two juxtaposed ends thereof. Any suitable means may be provided for mounting the rings 31, 32 and 33 in spaced insulated relation for movement in accordance with the movement of the cages, such as that suggested in the patent application, Serial No. 398,898, above-mentioned, wherein the rings 31, 32 and 33 are of equal diameter and mounted coaxially in spaced insulated relation on a drum which is rotated through an intervening gear mechanism by the rotation of one of the sheaves or sprocket wheels supporting the upper and lower extremities of the endless chains comprising the circuitous elevator.

A plurality of brushes or contact fingers 1a to 8a corresponding, respectively, to cages 1 to 8 are disposed stationarily, in a sequence corresponding to the relative positions of the cages, at regular angular intervals around the periphery of the split-ring 31, for engagement therewith.

The segment 34 of the ring 31 is electrically connected to the collector ring 33 by a conductor 38, and the segment 35 is connected to collector ring 32 by a conductor 39.

Brushes or contact fingers 40 and 41 are mounted stationarily for continuously engaging the collector rings 32 and 33, respectively, and establishing a connection therefrom to the direction relays 28 and 27, respectively.

It will thus be seen that, depending upon the physical position of the cages in the building structure 11, their corresponding brushes 1a to 8a will engage either segment 34 or segment 35 and thus, when an electrical connection is established to any of the brushes 1a to 8a, a circuit, for energizing the one or the other of the direction relays 27 and 28, is completed, and the motor 20 is actuated to move the cages until the insulating segment 36 engages the brush corresponding to the selected cage which effects the stopping of the driving motor and the proper positioning of the selected cage adjacent to the doorway 12.

The key-operated selective call switch 30 is provided for the purpose of connecting one of the brushes 1a to 8a to one terminal of a source of energy to thereby establish a call for a selected receptacle, and it is the novel construction of this switch, as well as the novel combination thereof in a control system for a circuitous elevator which embodies my invention.

Referring to Figs. 2, 3 and 4, the call switch 30 comprises a suitable supporting base 42 having a plurality of contact members 43 disposed in the same plane in radial rows and, in such manner as also to be disposed in concentric arcuate rows, a suitable insulating bracket 44 being provided for supporting them on base 42. Any number of contact members 43 may be provided which is equal to, or greater than, the number of cages in the circuitous elevator. Although technically not a part of the view shown in Fig. 3, I have, for the purpose of rendering my invention more readily understandable, illustrated, diagrammatically in broken lines, a plan view of sixteen contact members, showing the method of arranging them. There are only eight cages in the circuitous elevator, shown in Fig. 1, and, therefore, only eight of the sixteen contact members are utilized. The additional number of contact members is provided so that the switch may be employed in circuitous elevators having different numbers of cages.

A contact member 45 is caused to engage any particular one of the contact members 43 by employing one of a plurality of diverse keys 46 corresponding respectively, to a particular contact member 43, and, thereby, operating a lock 47 comprising my call switch 30.

The lock 47, of a well known type, is supported in spaced relation to the supporting base 42 by any suitable means, such as horizontally disposed rods or bars 47', which are shown in Fig. 2 but omitted from Fig. 3 for clarity, connecting each side of the lock to the base.

Any suitable means may be provided for causing the contact member 45 to engage a predetermined contact member 43 in response to the operation of the lock 47 by a key corresponding to the predetermined contact member. I have illustrated one embodiment of a means for effecting this result which comprises a lever mechanism for mounting the contact member 45 for universal movement. A lever arm 48, having a slot 49 in one end thereof and a sector 50 of a gear wheel constituting the other end thereof, is pivotally mounted, by a pin 50', at the axis of the gearwheel sector 50, between two spaced parallel guide plates 51 and 52, which are pivotally supported at the ends thereof for angular movement.

The contact member 45 is disposed at the ends of a resilient conducting contact arm 53 which is mounted in insulated relation upon a movable arm 54 constituted by two parallel members 54' and 54'' disposed on opposite sides of the arm 48 and connected by a pin 55 extending through the slot 49 in the arm 48, whereby the arm 54 may move slidably with respect to the arm 48 to alter the position of the contact member 45.

A sector 56 of a gear wheel, having a projecting member 57' thereon, is pivotally mounted, by a pin 56', at the axis of the sector, between the guide plates 51 and 52, in such position that the cooperation of its teeth and the teeth of the sector 50 is effected, whereby an angular movement of the lever arm 48 is caused in accordance with the angular movement of the sector 56.

I effect the angular movement of the sector 56 by means of any of the keys 46 which have a shoulder 57 thereon for engaging the projecting member 57' on the sector 56. When a key is inserted to its fullest extent in the lock 47, as determined by projections 46' on the key which engage the outside of the lock the shoulder 57 engages the member 57' and moves the sector 56 through an arc, the extent of the movement being in accordance with the position of the shoulder on the key. Thus, the arm 48 assumes a predetermined position in alignment with a predetermined row of contact members 43 depending upon the position of shoulder 57 on the key employed.

It should be clear that all the keys for moving the arm 48 to a position in alignment with the same radial row of contact members have their shoulders 57 positioned identically relative to the projections 46'. In other words, the arm 48 is moved to the same predetermined position whenever the keys for the same radial row of contact members are employed to operate the lock 47. Obviously then, where there are four radial rows of contact members 43, as illustrated in Fig. 3, there will be four groups of keys, each group having the shoulder 57 in a different position relative to the projections 46'.

A bell-crank member 58 is pivotally mounted, at the fulcrum thereof, between the guide plates 51 and 52, as by a pin or rivet 59. The end of one arm of the bell crank is pivotally secured, as by a pin 58', to the extreme lower end of the members 54' and 54'' comprising the lever arm 54. Thus, upon movement of the free end of the other arm of the bell crank 58, the arm 54 is slidably moved with respect to the arm 48. The slot 49 is of such length that the arm 54 moves, relatively to the arm 48, between extremities so spaced as to permit the positioning of the contact member 45 for engaging a contact member 43 in any of the concentric rows.

The movement of the free end of the bell crank 58 is effected by means of a projecting member 58a thereon which is engaged and moved by a shoulder 58b on any of the keys 46 when it is inserted to the fullest extent in the lock 47.

The extent of movement of the bell crank and, therefore, that of the contact member 45, is determined by the position of the shoulder 58b on the key employed.

It should be clear that all the keys corresponding to the contact members 43 of the same concentric row have the shoulder 58b positioned identically relative to the projections 46'. Thus the contact member 45 is moved to the same predetermined position whenever the keys for the same concentric row of contact members are employed to operate the lock 47. Obviously then, where there are four concentric rows of contact members 43, as illustrated, there will be four groups of keys, each group having the shoulder 58b in a different position relative to the projections 46'.

Furthermore, because there are four different positions of the shoulder 57 and four different positions of the shoulder 58b, the number of shoulder combinations possible on the keys is sixteen. That is, for each position of the shoulder 57, there are four possible different positions of the shoulder 58b. This is illustrated diagrammatically by the broken lines on the end portion 64 of the key 46 shown in Fig. 4. Therefore, I provide a key, for each contact member 43, the key having a contour for its end portion 64 different from that of all the other keys and I thereby selectively cause the contact member 45 to assume a different predetermined position for each key, when inserted to its fullest extent in the lock 47.

A pair of tension springs 60 is provided for the purpose of maintaining the pin 55, comprising the movable arm 54, normally in the extreme upper end of the slot 49, and also for maintaining the arm 48 in a position on one side of all of the contact members 43. The springs 60 are attached on the opposite sides of the gear-wheel sector 56, at some radial distance from the pin 56', by means of a projecting lug 61 extending through the sector and having suitable holes at the opposite ends thereof, in which the ends of the springs are secured. The opposite ends of the springs 60 are similarly attached to one arm of the bell crank 58 at a point intermediate the pins 59 and 58' by means of a lug 62 extending through the arm.

The plates 51 and 52 are pivotally mounted at each end, as previously mentioned, for angular movement from the vertical, so that, after a key is inserted to its fullest extent in the lock 47, the contact member 45 is caused to engage the contact member 43 corresponding to the key employed, by rotating the key through an angle while in the lock.

The ends of the plates adjacent to the lock 47 are secured to a disc portion 65 of the lock by means of suitable pins 66, the disc portion being angularly movable in accordance with angular movement of a key in the lock. The opposite ends of the plates, that is, the ends adjacent to the supporting base 42, are pivotally supported by means comprising a pivot pin 75 which is rotatably secured in a suitable bushing or bearing provided therefor on the base 42. The ends of the plates 51 and 52 are connected to the pin 75 by means of a downwardly extending lever arm 67, and a disc-like cam member 71 having converging flat sides. The upper end of the lever arm 67 is secured between the ends of the plates 51 and 52 by suitable screws 68, and to the cam member 71 on a flat-faced projection on the end thereof, in alignment with the pin 75, by suitable screws 68'. The pin 75, being rigidly secured to the opposite end of the cam member 71 adjacent to the base 42 in any suitable manner thus, pivotally supports the associated ends of the plates 51 and 52 for angular movement.

The arm 67 is obviously disposed in the plane of the arm 48, and, when a key is turned in the lock 47, through an arc, the arm 48 moves through the same arc to cause the contact member 45 to engage one of the contact members 43 corresponding to the key employed, while, simultaneously, the end of the arm 67 moves through an arc to engage the end of a core 69 of an electromagnet having a coil 70. The electromagnet is suitably mounted on the base 42, as by a bracket 70a and screws 70b, and is provided for the purpose of maintaining the contact member 45 firmly in engagement with a contact member 43 when the operator removes his hand from the key. The coil 70 is energized whenever the contact member 45 engages any of the contact members 43, as will be hereinafter explained in greater detail in connection with the operation of my control system, so that, as the contact member 45 engages a contact member 43, the operator may remove his hand from the key in the lock and it will be maintained in the circuit-closing position. Any other suitable means may be employed to perform the function of the electromagnet coil 70, such as a snap toggle mechanism.

The portions 63 of all the keys 46 (see Fig. 4) is identical in contour in order to permit all the keys to turn in the lock 47. The construction of the lock is such that a key cannot be removed therefrom unless the key is in the vertical position in which it is inserted into the lock.

The number of conductor turns comprising the coil 70 and the strength of the electric current employed for energizing the coil are preferably such that a key cannot be returned to the vertical and then removed from the lock unless a greater than normal amount of force is exerted to turn the key back.

Thus, in an emergency, the key may be turned back to the vertical, and the engagement of contact member 45 and any contact member 43 broken to interrupt the circuit established by the engagement of the contact members.

The disc-like cam member 71, previously mentioned, is provided with convergent flat sides, one flat side being disposed at an angle to the vertical when plates 51 and 52 are in a vertical position, for engaging one of two downwardly extending parallel conducting contact fingers 72, comprising a switch 73 of the type used in telephone circuits, to cause it to engage the other finger 72 and close the switch 73. The other flat side of the cam 71 is disposed vertically, when plates 51 and 52 are in a vertical position, so that the contact fingers 72 of a switch 74, similar to switch 73, do not touch each other and thus in this position of the cam 71 switch 74 is open.

When the plates 51 and 52 are moved through an angle by the turning of a key in the lock, the cam 71 is likewise turned through the same angle and, when the contact member 45 engages any contact member 43, the positions assumed by the flat sides of the cam 71 are such as to effect disengagement of the contact fingers comprising switch 73, and the engagement of contact fingers comprising switch 74, thereby opening switch 73 and closing switch 74.

The contact fingers 72, comprising the switches 73 and 74, are suitably secured to an insulating block 76 attached to the supporting base 42, as by screws 77. Any suitable method of attaching electrical conductors to the ends of the contact fingers 72 may be adopted, such as, for example, soldering the ends of conductors directly to the fingers, as shown at 78 in Fig. 2.

I employ the switches 73 and 74 for effecting the actuation of a reversible motor 81, illustrated as of a three-phase induction type, for operating a closure for the doorway 12, such closure being, for example, a pair of sliding doors 82 and 83.

The doors are mounted in any well known manner, as by pulleys attached to the upper edges thereof, which operate on a suitably disposed bar or track (not shown) attached to the building structure 11. The motor 81 drives a horizontally disposed endless chain 84, for moving the doors, which chain is suitably mounted by means of sprocket wheels or sheaves 85 and 86 disposed at opposite ends of the chain and keyed or splined to pins or shafts retained in suitable bearing members (not shown).

The upper edge of door 82 is attached to the lower run of the endless chain 84 by a suitable connector 87, and the upper edge of the door 83 is attached to the upper run of the endless chain 84 by a suitable connector 88, so that, upon rotation of the endless chain 84 by the motor 81, in one direction, the doors are simultaneously moved in opposite directions away from the center of the doorway 12 to open it, and, upon movement of the endless chain 84 in opposite direction by a reverse direction of rotation of the motor, the doors are simultaneously moved toward each other to close the doorway 12.

Any suitable means for causing the motor 81 to move the endless chain 84 may be provided, such as the sprocket wheel 89, which is keyed to the same shaft as is the sprocket wheel 86 supporting one end of the chain 84, and a sprocket wheel 90 keyed to the shaft of the motor 81, the sprocket wheels 89 and 90 being connected by an endless chain 91.

A pair of relays 92 and 93 is provided for effecting the actuation of the motor 81 to cause the closing and the opening, respectively, of the doors 82 and 83. The coil of relay 92 is energized by the closing of switch 74, which occurs whenever a key operates the call switch 30 to move the contact member 45 into engagement with any of the contact members 43, so that the contact members of relay 92 establish the proper electrical connections to motor 81, whereby doors 82 and 83 are closed.

The coil of relay 93 is energized by the closing of switch 73, which occurs whenever the plates 51 and 52 of the call switch 30 are returned to their vertical positions, and the cam member 71 is caused to close the contact members of switch 73. The closing of the contact members of relay 93, effected by the energization of relay 93, establishes the proper electrical connections to motor 81, whereby doors 82 and 83 are opened.

A switch 94, of a well known type is provided which is operable to a closed position whenever the doors 82 and 83 are completely closed. I employ switch 94 to prevent the actuation of either of the relays 27 or 28 controlling the actuation of the driving motor 20 for the circuitous elevator, unless the doors 82 and 83 completely close the doorway 12. The operation of the circuitous elevator is thus prevented, unless the doors 82 and 83 completely close the doorway 12.

A drum-type switch 94a, of a well known type, is provided which is movable in accordance with the movement of the doors 82 and 83 to effect the stopping of the motor 81 at the extremes of travel of the doors. The switch 94a comprises contact members 95 which are normally closed when the doors 82 and 83 are open to permit the actuation of the relay 92 to close the doors 82 and 83 and which are opened when the doors are completely closed to effect the stopping of the motor 81. The switch 94a also comprises contact members 96 which are closed when the doors are closed to permit the actuation of relay 93 to open the doors, and which are opened to deenergize the relay 93 and stop the motor 81 when the doors completely open the doorway 12.

A brake 97, of a well known type, is provided for the motor 81 and comprises a magnetizing coil 98 which is energized to release the brake whenever either of the relays 92 and 93 is energized. Additional means, not shown, such as a spring, is provided for the brake 97 to cause it to automatically set on the motor 81 whenever the coil 98 is deenergized.

An emergency stop switch 122, of a well known push-button type, is provided for interrupting the control circuit for the motor 20 at any time and thus immediately stop the movement of the cages at any time. The operation of the emergency switch 122 is supplemental to the turning back of a key to the vertical, either or both operations effecting the immediate stopping of the elevator.

The operation of my invention as a whole and the coordination of the various parts associated therewith, may best be understood by an assumed operation. Let it be assumed that an automobile is driven to, and stopped immediately in front of, the doorway 12, at a time when the doors 82 and 83 are open, the cages stopped in positions, as shown in Fig. 1, with cage 1 at the doorway and having an automobile thereon. Let it be further assumed that the driver of the automobile which stopped in front of the doorway, possesses a key corresponding to cage 3. The driver gets out of the automobile, inserts his key in the lock 47 and turns it through an angle.

The turning of the key in the lock effects the closing of the switch 74, as previously described, to close a circuit for energizing the coil of relay 92 resulting in the closing of the doors 82 and 83. This circuit extends from supply conductor L1, through conductors 100, 101 and 102, switch 74, conductor 103, limit switch 95 (now closed), conductor 104, coil of relay 92, conductor 105, normally closed contact members e of relay 93 and conductor 106 and 107, to supply conductor L2.

The energization of the coil of relay 92 effects the closing of the normally open contact members a, b, c and d, and the opening of the normally closed contact members e of that relay.

The opening of the contact members e prevents the energization of the coil of relay 93 simultaneously with the energization of relay 92.

The closing of contact members d of relay 92 completes a circuit for energizing the coil 98 of the brake 97, associated with the door-operating motor 81, which circuit extends from supply conductor L1, through conductor 100, coil 98, conductors 108 and 109, contact members d of relay 92, and conductors 110 and 107, to supply conductor L2. The brake 97 is thus released by the energization of the coil 98, and the motor 81 is freed for rotation upon energization of the three-phase windings A, B and C of the motor 81, effected by the closing of the contact members a, b and c of relay 92.

The closing of the contact members a, b and c of relay 92 establishes the connection from the terminals of the phase windings A, B and C of the motor 81 to the three-phase alternating-current supply conductors ac2, ac1, and ac3, respectively. The connection for phase A extends from supply conductor ac2, through conductor 111, contact members a of relay 92, and conductors 112 and 113, to the terminal of phase A. The connection for phase B extends from supply conductor ac1, through conductor 114, contact members b of relay 92 and conductors 115 and 116, to the terminal of phase B. The connections for phase C extend from supply conductor ac3, through conductor 117, contact members c of relay 92 and conductors 118 and 119, to the terminal of phase C. The motor is thus actuated to rotate in a direction to cause the endless chain 84 to move the doors 82 and 83 toward each other to close the doorway 12 and thereby prevent any one from entering the building while the elevator is moving.

When the doors 82 and 83 completely close the doorway 12, the switch 94 closes and thereby completes a circuit for energizing the holding coil 70 on the call switch 30 and the coil of relay 27. Inasmuch as the holding coil 70, for maintaining the lever arm 67 in its operated position, cannot be energized until the doors 82 and 83 completely close the doorway 12, it is necessary that the operator hold the key in its extreme operated position until the doors are completely closed, and the switch 94 closes the circuit for energizing the holding coil; at which time the operator may release his hand from the key. The circuit for energizing the coil 70 and the coil of relay 27 extends from supply conductor L1, through conductors 100 and 120, switch 94, conductor 121, emergency stop switch 122, conductor 123, coil 70, conductor 124, contact arm 53, contact member 45, one of the contact members 43 designated as contact member 3b, conductor 125, brush 3a, segment 34 on the direction selector 29, conductor 38, ring 33, contact finger or brush 41, conductor 126, coil of relay 27, conductor 127, normally closed contact member a of relay 28 and conductor 128, to supply conductor L2.

The energization of the holding coil 70 retains the lever arm 67 in a position to maintain the contact member 45 firmly in engagement with the contact member 3b.

The energization of the coil of relay 27 effects the opening of the normally closed contact members a and the closing of the normally open contacts members b, c, d and e of that relay.

The opening of the contact members a of relay 27 prevents the energization of the coil of relay 28, simultaneously with the energization of the coil of relay 27.

The closing of the contact members b of relay 27 completes a circuit for energizing the coil 26 of the brake 25, associated with the driving motor 20, which circuit extends from supply conductor L1, through conductor 129, coil 26, conductors 130 and 131, contact members b of relay 27 and conductor 128, to supply conductor L2.

The energization of the coil 26 releases the brake 25 and permits the rotation of the motor 20 upon the energization of the three-phase windings X, Y and Z of the motor 20 effected by the closing of the contact members c, d and e of relay 27.

The connections for phase X extend from alternating-current supply conductor ac3, through conductor 132, contact members c of relay 27 and conductors 133 and 134, to the terminal of phase X. The connections for phase Y extends from the alternating current supply conductor ac2, through conductor 135, contact members d of relay 27 and conductors 136 and 137, to the terminal of phase Y. The connections for phase Z extend from supply conductor ac1, through conductor 138, contact members e of relay 27 and conductors 139 and 140, to the terminal of phase Z.

The motor 20 is thus actuated to rotate in a direction to cause the cages of the circuitous elevator to move in a clockwise direction.

The motor 20 continues to move the circuitous elevator until the insulating segment 36 engages the brush 3a, at which time the circuit previously traced for energizing the holding coil 70 and the coil of relay 27 is opened, and the coils are deenergized.

The deenergization of the coil of relay 27 effects the opening of the connections to the phases X, Y and Z of the motor 20, and the deenergization of the coil 26 of the brake 25, which results, respectively in the stopping of the cages and the setting of the brake 25 on the motor 20. The contact member a of relay 27 closes to permit the energization of the coil of relay 28 if subsequently desired.

At this time, cage 3 is stopped in the proper position adjacent to the doorway 12 for driving an automobile thereupon, as soon as the doors 82 and 83 are opened.

The opening of the doors is effected by the closing of the switch 73 when the driver of the automobile removes his key from the lock 47. The closing of the switch 73 closes a circuit for energizing the coil of relay 93, which circuit extends from supply conductor L1, through conductor 100 and 101, switch 73, conductor 141, limit switch 96 (now closed) conductor 142, coil of relay 93, conductor 143, contact members e of relay 92 and conductors 106 and 107, to supply conductor L2.

The energization of the coil of relay 93 closes the normally opened contact members a, b, c and d, and opens the normally closed contact members e of that relay.

The opening of the contact members e prevents the energization of the coil of relay 92 simultaneously with the energization of the coil of relay 93.

The contact members d of relay 93 are connected in parallel with the contact members d of relay 92 and, when they close, they complete a circuit substantially as previously traced, for energizing the coil 98 of the brake 97, associated with the door-operating motor 81, whereby it is freed for rotation upon the energization of its phase windings, A, B and C, effected by the closing of the contact members a, b and c of the relay 93.

The connection for phase A of the motor 81 extends from supply conductor ac1, through conductor 144, contact members a of relay 93 and conductor 112 and 113, to the terminal of phase A. The connection from phase B extends from supply conductor ac2, through conductor 145, contact members b of relay 93 and conductors 115 and 116, to the terminal of phase B. The connection for phase C extends from supply conductor ac3, through conductor 146, contact members c of relay 93 and conductors 118 and 119, to the terminal of phase C.

It will thus be seen that the connections to the phases are so established as to effect rotation thereof in a direction opposite to that effected by the actuation of relay 92. The motor 81, therefore, moves the chain 84 in a direction to cause the doors 82 and 83 to open the doorway 12. When the doors have reached the extremities of their travel, the limit switch 96 opens, and the stopping of the motor 81 is thereby effected.

The driver of the automobile, having previously reentered it, drives it directly through the doorway 12 and upon the receptacle 3, stopping it in its proper position thereon. He then locks his automobile and departs, leaving the circuitous elevator in a condition for subsequent operation by any other patron. As will be understood from the above explanation, the doors 82 and 83 are normally left in an open position and are closed only when the cages are moving. Thus, the driver leaves the doors in an open position and subsequent operation of the call switch 30 by another patron effects their closure as described.

The above description of the operation of my control system is deemed sufficient without describing or tracing in detail the circuits for effecting the reverse direction of movement of the circuitous elevator, since the operation is substantially the same, except that the relay 28 is employed instead of relay 27.

It will, therefore, be seen that I have provided a control system for a circuitous elevator of great simplicity and having a minimum cost.

It will be further seen that I have provided, in combination with a control system for a circuitous elevator, a key-operated control switch for selectively establishing a call for any particular cage in accordance with the key employed. It will be also seen that the key-operated control switch which I employ possesses numerous advantages over control switches heretofore employed or suggested.

It is understood that my invention is capable of various modifications without any departure from the spirit thereof. It is desired, therefore, that no limitations shall be imposed thereon, except such as are necessitated by the prior art and by the scope of the appended claims.

I claim as my invention:

1. In a control system for a motive means for moving a plurality of receptacles in an endless path, means for selecting any particular one of said receptacles comprising a multi-unit control device, each unit of said control device corresponding to a particular receptacle, a lock, a key corresponding to each of said control-device units for operating said lock, and means for effecting the closing of any one of the said control device units upon the operation of said lock by employing one of said keys corresponding thereto, and means, movable in accordance with the movement of said receptacles, which is cooperable with said selecting means to effect the actuation of said motive means to move a selected receptacle to a predetermined position by the shortest route.

2. In a control system for a motive means for moving a plurality of receptacles in an endless path, means for selecting any particular one of said receptacles comprising a multi-unit control device, each unit of said control device corresponding to a particular receptacle, a lock, a key corresponding to each of said control device units for operating said lock, and means for effecting the closing of any one of said control device units upon the operation of said lock by employing one of said keys corresponding thereto, and means, movable in accordance with the movement of said receptacles, which is cooperable with said selecting means to effect the actuation of said motive means to move a selected receptacle to a predetermined position by the shortest route and to effect the stopping of said motive means upon the arrival of the selected receptacle at the predetermined position.

3. In combination, an endless conveyor including a plurality of receptacles movable in an endless path, a door, a control device for selectively registering a call for a receptacle corresponding to the call registered, and means operable in response to the operation of said control device for causing said door to close.

4. In combination, an endless conveyor including a plurality of receptacles movable in an endless path, a door, a control device for selectively registering a call for any one of said receptacles and movable from a normally ineffective position to an operative position, and means responsive to the operation of the said control device to its operative position to cause said door to close and responsive to the normally ineffective position of said control device to cause said door to open.

5. In combination, an endless conveyor, comprising a plurality of receptacles movable in an endless path, and means for controlling the movement of said receptacles comprising a control device, a lock for said control device, and a plurality of keys therefor, each key corresponding to a particular receptacle, and means responsive to the operation of said control device for selectively controlling the movement of any receptacle when a key corresponding thereto is employed.

6. In combination, an endless conveyor, comprising a plurality of receptacles movable in an endless path, motive means for moving said receptacles, and means for effecting the actuation of said motive means whereby the movement of a predetermined receptacle is selectively controlled, said means comprising a control device, a lock for controlling the operation of said control device and a plurality of keys therefor, each of said keys corresponding to a particular receptacle, and means included in said control device responsive to the operation of said lock for selectively effecting the actuation of said motive means in accordance with the particular key employed.

7. In combination, an endless conveyor comprising a plurality of receptacles movable in an endless path, means for selecting a particular receptacle comprising a plurality of switches, one for each of said receptacles, a key-operated lock for selectively controlling the operation of said switches, a plurality of keys each corresponding to a particular receptacle for operating said lock to operate the respective switches, and means cooperating with a selected switch for effecting the movement of the corresponding receptacle to a predetermined position by the shortest route and the automatic stopping of the receptacle at the predetermined position.

HAROLD E. WHITE.